Dec. 27, 1938.  F. D. WENN  2,141,778
HAND OPERATED BRAKE LEVER
Filed April 23, 1937  2 Sheets-Sheet 2

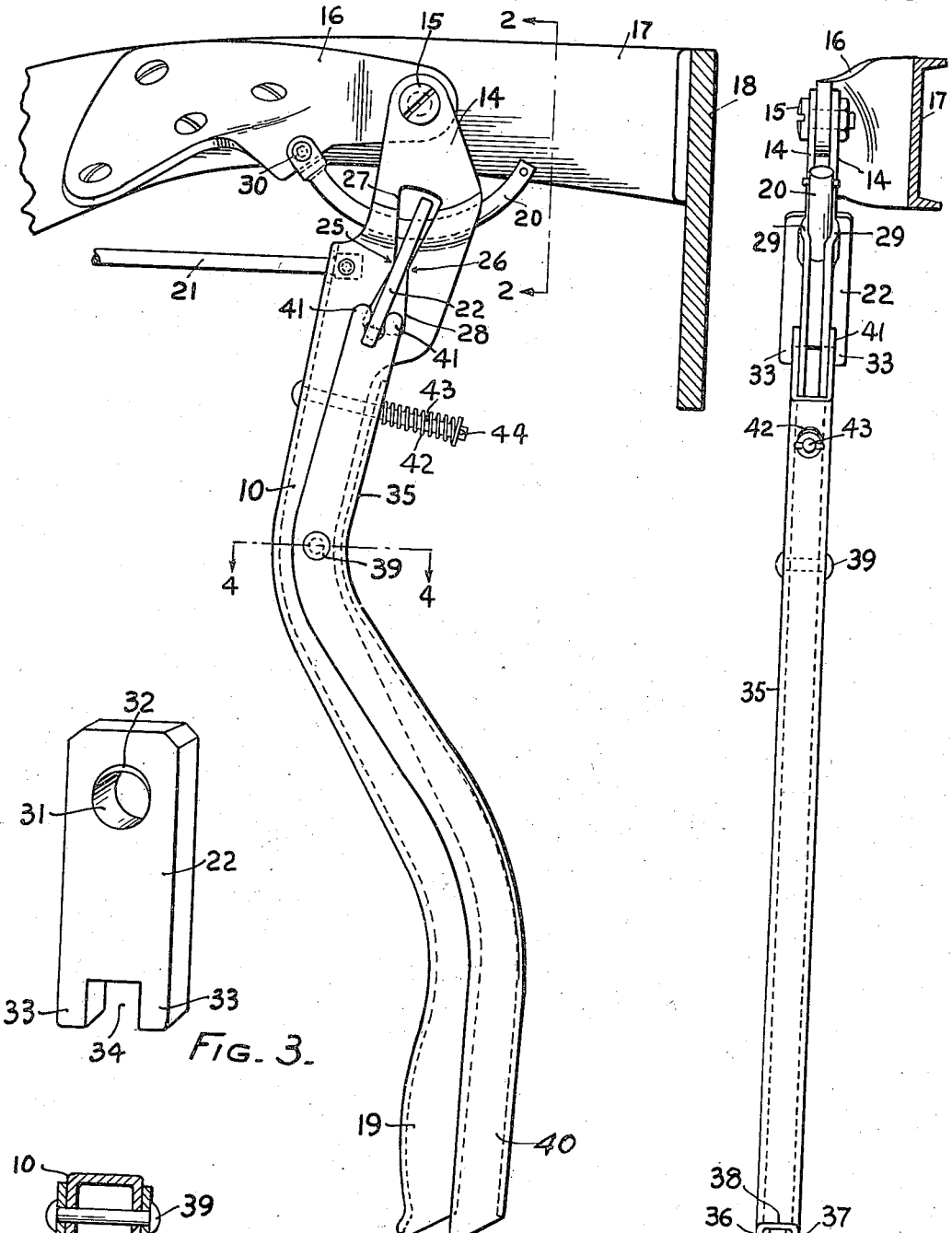

INVENTOR.
Floyd D. Wenn
BY Louis Illmer
ATTORNEY.

Patented Dec. 27, 1938

2,141,778

UNITED STATES PATENT OFFICE 2,141,778

HAND OPERATED BRAKE LEVER

Floyd D. Wenn, Binghamton, N. Y., assignor to The Brewer-Titchener Corporation, Cortland, N. Y., a corporation of New York Application April 23, 1937, Serial No. 138,546

7 Claims. (Cl. 74—531)

This invention relates to certain novel structural aspects pertaining to an inherently simple emergency brake control lever for automotive and other vehicles that facilitate economical fabrication of component parts, there being but three essential pivotal points needed to operatively assemble my unitary lever devices on a rapid productive scale.

The primary lever to which the usual brake rod is herein attached, may be swung on a main fulcrum carried by a stationary rack or bracket plate. Pivotally mounted between the ends of such primary lever, is a spring actuated auxiliary or manipulative trip lever preferably having a channel-shaped body profile. One end of such trip lever is extended to provide for a thumb piece disposed alongside the handle region of the primary lever, while the other or toe end of such trip lever operatively engages one end of an improved floating clutch block. The opposite end region of this relatively flat block is apertured to loosely receive therethrough an arcuate sector rod or bar the axis of which is preferably disposed concentrically about the main fulcrum. The clutch block intermediate its ends, may be floatingly mounted between a pair of fulcrums and when assuming a substantially cocked relation to the rod axis, said block is made to bitingly grip or pinch the rod surface as a one-way clutch agency that firmly retains the brake rod setting in any desired position.

My manipulative trip lever serves as a remote control for releasing said block after such setting of the primary brake lever. Interposed spring means act to normally cock and tiltingly throw said block into locked engagement with the sector rod, but the block, when released may be freely slipped lengthwise of the rod in either direction while the driver presses the trip lever thumb piece toward the handle of the primary lever.

The present style of brake lever is more particularly designed for pivotal suspension behind an automotive instrument board. The depending lever end is located within easy reach of the driver, the lever handle being raised about the main fulcrum to apply the brakes. The assembly is so mounted that the thumb piece of my auxiliary lever is placed toward the driver and rearwardly of the primary lever handle. This arrangement allows the gripped lever handle to be strenuously drawn rearwardly in the direction of the driver's seat to apply the brakes without at the same time, causing the associated thumb piece to be inadvertently manipulated. By fulcruming the clutch block between its ends, all intermediary levers and links together with locking rollers or the like extraneous adjuncts may be eliminated, and the brake lever assembly made to function without confusion in an obvious manner identical with the conventional toothed sector and ratchet type of emergency brake now in common use.

An outstanding reason for resorting to the present toothless instrumentalities, lies in the material reduction of fabrication cost afforded; also in being able to set up the brakes to any desired extent without overloading any of the parts. Where a driver is obliged to reach a given extreme tooth setting, such stepwise brake adjustment is often difficult to release, particularly by women drivers.

The object of my invention is to devise a simplified and easily manipulative brake lever assembly of the indicated character that may readily be incorporated in new automotive equipment and fabricated on a rapid productive basis at the minimum of machine labor and assembly cost.

Reference is had to the accompanying two sheets of drawings which are illustrative of a preferred embodiment and in which:

Fig. 1 is an elevational side view of a brake lever assembly equipped with my improved clutch block devices, and Fig. 2 an edge view thereof, the lever being set in its mid travel position.

Fig. 3 details in perspective, a side face of such block, while Fig. 4 represents a view along line 4—4 of Fig. 1.

Figures 5, 6:
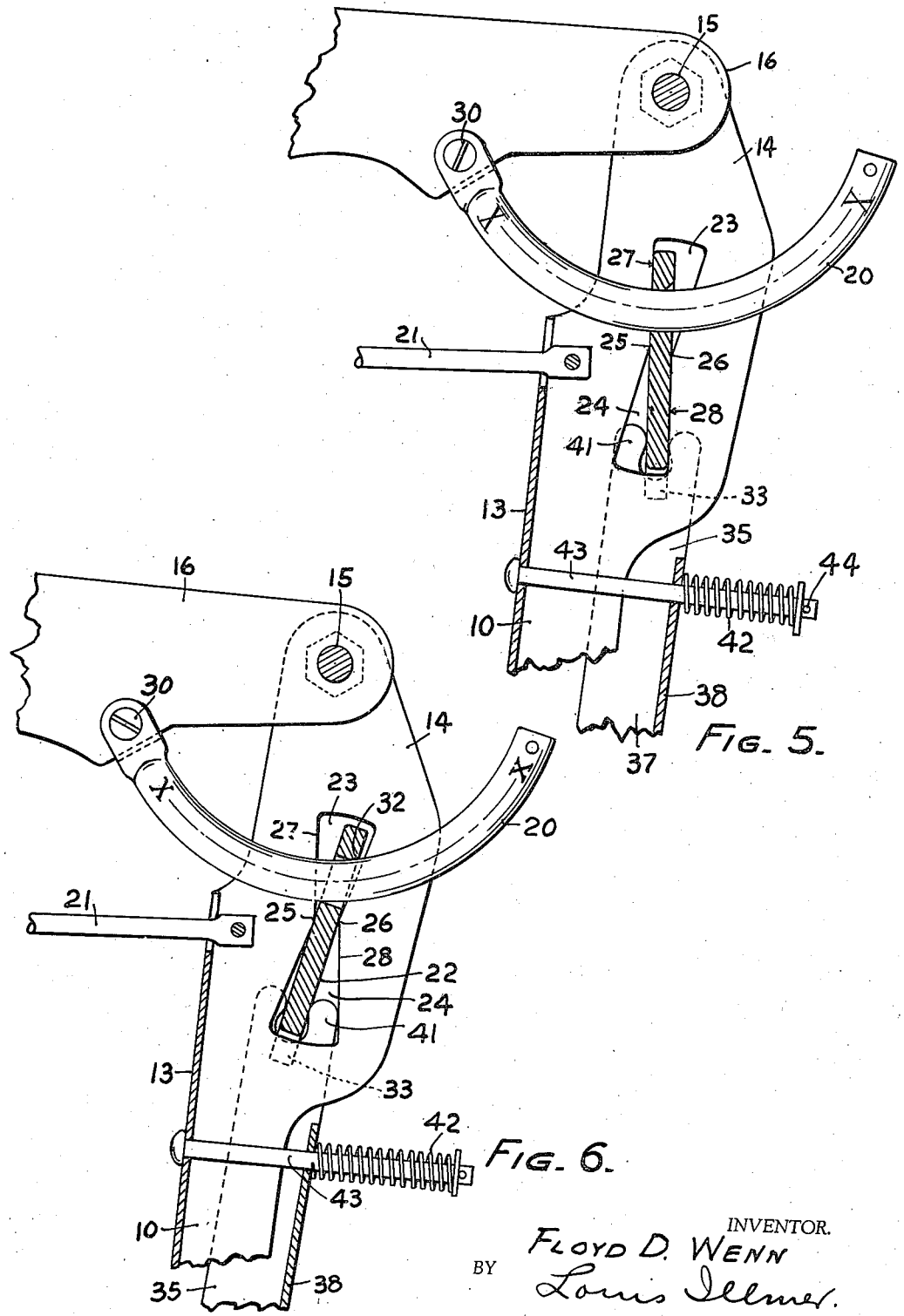
Fig. 5 depicts a sectional fragment of said assembly with the lever in a brake release position and having the manipulative finger piece of the trip lever gripped inwardly toward the handle of the primary lever.
Fig. 6 is similar to Fig. 5 but shows the relationship of the clutch block in set brake position.

In the preferred exemplification, a primary lever 10 may be given a Z-like configuration and stamped up from a sheet metal blank into a cross-sectionally channeled shape to comprise a pair of similar side flanges 11 and 12 that are formed integral with the web 13. The wider pivotally suspended end of each such flange may be parallelly extended to constitute an apertured companion fork 14 mounting the main fulcrum 15, the latter being carried through a bearing in the warped bracket plate 16. Said stationary plate may be demountably attached to a suitable body beam or the like fixture 17 that is located interiorly behind i. e. forwardly of the automotive instrument board 18 in a conventional manner. The opposite swinging end of the primary lever 10 may be shaped into a depending tubular handle or grip portion 19 of which the parallelly spaced side flange edges are preferably faced rearwardly toward the driver's seat.

One end of an arcuate sector bar or rod 20 of hardened metal may be bolted at 30 to said bracket plate as shown or otherwise retained against longitudinal movement, the center of curvature of said rod being preferably kept coincident with the axis of the main fulcrum 15. Each lever fork 14 may be recessed to provide for a curved guide groove 29 or similar clearance around the interposed sector rod 20. However, it is not essential to use duplicated or balanced forks, instead a single strap element of this kind may likewise be resorted to. The reciprocative brake or draft rod 21 is preferably attached to the primary lever adjacent to the sector rod, thence carried forwardly and downwardly through the vehicle floor to actuate a brake band (not shown).

Each fork region of my primary lever is pierced by registering bipartite slots whose respective endless perimeters are given a special lobe-shape pattern adapted to receive and to constitute fulcrum means for my floatingly mounted clutch block 22. To this end, such similar patterns may be cut in the lever flanges 11 and 12, each including a pair of relatively inverted triangular perforations 23 and 24 of which the respective apex regions are interconnected to shape up a common block mounting slot including opposed obtuse fulcrum projections or reentrant block rocking points such as 25 and 26 that are integral with the primary lever 10. A diverging perimetric portion of one such triangular flange perforation is reversely directed with respect to the corresponding portion of the other perforation. Such reversed disposition affords mated rectilinear stop edges such as 27 and 28 that align endwise and of which one such edge lies in substantial rectangular relation with respect to the curved axis X—X of the sector rod, said one stop edge being preferably directed radially toward but slightly offset from the center of the main fulcrum 15, as shown.

A suitable layout for my one-way clutch block 22 is detailed in Fig. 3 and as such may take the form of a hardened elongated metal plate of which one end region has a round or oval aperture 31 whose major diametral size is kept somewhat larger than the sector rod mounted therethrough. Said aperture allows the plate faces to rock laterally within finite limits with respect to the embraced sector rod. An edge portion of such aperture may be rounded or chamfered as at 32.

The opposite block end is preferably shrouded by complementary toothlike jaws such as 33 having a gap 34 therebetween that engages a projection on the manipulative trip lever, as will appear presently. It is emphasized that when my clutch block is floatingly nested within said flange slots and operatively mounted on the sector rod as detailed in Figs. 6 and 7, the fulcrum points 25 and 26 rockingly contact opposed block faces intermediate the respective ends thereof, that is to say, the block 22 is of a type in which its fulcrum is located between the sector rod and the actuated block end.

My floatably mounted block is enabled to ride radially toward or away from the main pivot or fulcrum 15 because of being slidable lengthwise between its fulcrum agency as embodied in the opposed rocking points 25 and 26. Such compensation corrects for misalignment or contour irregularity on part of the sector rod and allows the released brake lever to be shifted without restraint.

The unitary trip lever 35 may also be stamped up from sheet metal into channeled form to comprise a pair of side flanges 36 and 37 interconnected by the web member 38 whose contour generally conforms to the web 13. The primary lever flanges 11 and 12 may be telescoped within the spaced side flanges of said trip lever as is cross-sectionally shown in Fig. 4, with the respective lever webs arranged in opposed relation to constitute an enclosed boxlike arm structure. A transverse fulcrum pin 39 extends through all such mated flanges and serves to pivotally mount the trip lever on the primary lever intermediate the respective ends thereof. The clutch block rocking points may be slightly offset with respect to a center-line that interconnects the third fulcrum 39 with the main fulcrum 15. The depending swinging end of the trip lever 35 may be given a dished or spoon shaped thumb piece 40 that is carried alongside the lever grip 19 in superimposed relation whereby to manipulatively release the engaged clutch block, said thumb piece being placed rearwardly of the main lever handle for convenient manipulation in a proper direction when the gripped handle is moved in unison therewith. The other or toe end of the trip lever is bifurcated to provide for complementary tongues such as 41 adapted to mesh with the bottom edge of the block gap 34 and have the block jaws 33 extend radially outward from the pivot 15 beyond such bottom edge to constitute a rockable joint of the shrouded type as shown.

As intimated, the trip lever web is also mounted rearwardly toward the driver's seat and the retractible thumb piece 40 is shaped to embrace the grip handle 19 therein. Said lever grip and thumb piece may normally be thrust apart by the use of a helical compression spring 42 or the equivalent thereof, which is here mounted around the shank of a headed rivet 43 that may extend through both lever webs 13 and 38 in the Fig. 5 manner. A cotter pin or the like keeper means 44 demountably retains said spring under initial compression. The thumb piece requires but slight movement to release the clutch block. After being pressed toward the grip of the primary lever, the spring 42 automatically returns said thumb piece into its initial position.

When the working parts are assembled as in Figs. 5 and 6, the intended mode of operation may be traced as follows:

The spring 42 normally throws the meshed toe end of the trip lever toward the web of the primary lever. The opposed edge regions of the clutch block aperture 31 then tightly pinch or bitingly grip the sector rod 20 therebetween. The floating clutch plate 22 correspondingly lies in a cocked relation with respect to the rod axis X—X, and is resiliently retained in such locking position by said spring. While the clutch plate remains locked, the thumb piece of the trip lever is thrust away from the primary lever grip by spring action.

Should the thumb piece 40 now be pressed forwardly toward the encased grip 19, this will slightly rotate the clutch plate counterclockwise about its fulcrum point 26 as seen in Fig. 6 and thereby bring the longitudinal center-line of said plate into a substantially right angular relation with respect to the arcuate rod axis X—X as in Fig. 5. When so rotated, the released biting edges of the aperture 31 allow the primary lever to be freely shifted in either direction between its extreme swing positions. After the liberated thumb piece 40 is allowed to return into its normal position, the spring 42 again throws and retains the clutch block in operative locked engagement with the sector rod. In order to confine the tilt of said floating block within finite limits, a face thereof abuts one of the mated stop edges 27 or 28, thus preventing any excessive tilt overtravel that might otherwise throw the apertured block into a reversed locking engagement with the sector rod. The opposite tilt or intended locking position of the clutch block is fixed by the perimetric shape given to the rod receiving aperture 31 without allowing the block to stop against any edges of the flange perforations 23 and 24.

Assuming the brake lever to have previously been swung well forwardly away from the instrument board into "off" or slackened brake band position, the primary handle 19 is ready to be grasped by the driver's fingers and the clutch block drawn rearwardly along the sector rod until the brake band reaches any desired set position, all without having to first depress the thumb piece 40 or otherwise actuate some remote manipulative pawl control. The assembly now acts in the capacity of a one-way brake lever in ratchet fashion which remains firmly locked until the actuated thumb piece deliberately releases the clutch block. Any brake applying tension exerted in the set brake rod 21 has a tendency to automatically augment the clutch grip on the sector rod 20.

While depressed, the resulting inward movement of the thumb piece toward the lever grip is definitely restricted by the aforesaid stop edge abutment and otherwise provides for an inherently simple and easily understood manipulation that closely conforms to that of the toothed ratchet type of brake lever. A single spring is arranged to render the installed brake assembly rattleproof. Furthermore, the major length portion of the primary lever is incased behind the web and between the side flanges of my trip lever so as to afford a neat trim suitable for installation in high grade passenger cars, the resulting stream-lined lever assembly being made acceptable for present day automotive purposes.

It will be obvious that my primary lever need not be stamped up from sheet metal but may also be solidly forged. As will be understood by those skilled in this art, the disclosed improvements also find application to other than emergency brake lever uses and that various structural changes in the details and disposition thereof may be resorted to in likewise carrying out my illustrative embodiment, all without departing from the spirit and scope of my invention heretofore described and more particularly pointed out in the appended claims.

I claim:

1. In a vehicle brake actuating assembly adapted to be hand operated by a driver, a primary lever provided with a transverse pivot located between the lever ends, a main fulcrum mounting one end region of said lever, a handle at the other lever end, a brake rod attached to the primary lever, a manipulative trip lever mounted intermediate its ends upon the transverse pivot, one trip lever end being shaped into a manipulative thumb piece that extends alongside of said handle and lies toward the driver, a longitudinally retained arcuate sector bar whose center of curvature substantially coincides with the axis of the main fulcrum, an elongated clutch block directed lengthwise of and floatingly borne by the primary lever between opposed rocking points located medially of the block length and formed integrally with the primary lever to allow for a combined longitudinal and rocking tilt movement of the block about such fulcrum agency, said clutch block being apertured at one end region and having the sector bar entered therethrough, means operatively interconnecting the other end region of the clutch block with a contiguous end portion of said trip lever, and resilient thrust means urging said thumb piece away from the handle.

2. In a vehicle brake actuating assembly adapted to be hand operated, a primary lever provided with a transverse pivot located between the lever ends, a stationary bracket plate mounting a main fulcrum upon which one end region of said lever is suspended, a handle located at the depending lever end, a brake rod attached to the primary lever, a manipulative trip lever mounted intermediate its ends upon the transverse pivot and having a channeled cross-sectional profile including web interconnected flanges that embrace the major portion of the primary lever length, one trip lever end being shaped into a manipulative thumb piece that extends exteriorly alongside of said handle, a sector bar supported by the bracket plate, an elongated one-way clutch block floatingly borne lengthwise of the primary lever to rockingly tilt about compensating fulcrum means, said block being apertured at one end region with the sector bar entered therethrough and which aperture comprises a pair of opposed pinch edges that when urged into a certain tilted lock position firmly grip the bar therebetween, means operatively interconnecting the other end region of the clutch block with the contiguous end portion of the trip lever, said thumb piece when manipulated toward the lever handle serving to rockingly shift the clutch block edges into a gripless tilt position wherein said edges are freed to move lengthwise of the sector rod axis in either direction, and resilient thrust means urging the pinch edges of said clutch block into locked engagement with the sector rod when the thumb piece is liberated.

3. In a vehicle brake actuating assembly adapted to be hand operated, a sheet metal primary lever provided with a transverse pivot located between the ends thereof and of which lever one end portion has a channeled cross-sectional profile including web interconnected side flanges that terminate in a handle and the opposite lever end portion is bifurcated into complementary forks, a stationary bracket plate interposed between the lever forks, a sector bar carried by the bracket plate, a main fulcrum pivotally interconnecting said forks to the bracket plate, each such forked flanges being provided with a slot having registering perimeters that respectively comprise a pair of opposed reentrant fulcrum points located intermediate the sector bar and the lever handle, a brake rod attached to the primary lever, a manipulative trip lever mounted intermediate its ends upon the transverse pivot, one trip lever end being shaped into a manipulative thumb piece, an elongated clutch block floatingly mounted in said registering slots to rockingly tilt about certain of said fulcrum points, said block being apertured at one end region to freely pass the sector bar therethrough and which aperture comprises a pair of opposed pinch edges that when tilted into a certain lock position serve to firmly grip the bar therebetween, means operatively interconnecting the other end region of the clutch block with a contiguous end portion of the trip lever, said thumb piece when manipulated serving to shiftably tilt the clutch block edges into a released position, and resilient thrust means urging said pinch edges of the clutch block into locked position when the thumb piece is liberated.

4. In a vehicle brake actuating assembly adapted to be hand operated by a driver, a sheet metal primary lever having a channeled cross-sectional profile including flanges provided with a transverse pivot located between the lever ends, a main fulcrum mounting one end region of said lever, a handle at the other lever end, a brake rod attached to the primary lever, a manipulative sheet metal trip lever mounted intermediate its ends upon the transverse pivot and having a channeled cross-sectional profile including a pair of web interconnected flanges that are telescoped with respect to the major length portion of the primary lever flanges, one trip lever end being shaped into a manipulative thumb piece that extends alongside of said handle to lie toward the driver and the other trip lever end terminating in a bifurcated toe, a longitudinally retained arcuate sector bar whose center of curvature substantially coincides with the axis of the main fulcrum, an elongated one-way clutch block mounted lengthwise upon the primary lever to rockingly tilt about a pivotal agency integral with the last named lever and located intermediate the lever handle and the sector bar, said block being apertured at one end region to pass the sector bar therethrough and the confining walls of which aperture comprise a pair of opposed pinch edges that are freely movable lengthwise of the assembled sector bar when said edges are simultaneously tilted about said pivotal agency into a certain extreme release position and which edges when tilted into a relatively different position with respect to the longitudinal axis of the sector bar firmly grip the bar therebetween to lock the primary lever against brake release movement, a socketed joint operatively meshing the other end region of the clutch block with the toe end of the trip lever, said thumb piece when manipulated toward the lever handle serving to shiftably tilt both clutch block edges into released position wherein the respective axes of the block aperture end of the bar lie in substantial parallelism, and resilient means normally thrusting said thumb piece away from the handle and urging said pinch edges of the clutch block into locked position when the thumb piece is liberated.

5. In a vehicle brake actuating assembly adapted to be hand operated, a primary lever provided with a transverse pivot located between the lever ends, a main fulcrum mounting one end region of said lever, a handle at the other end, a brake rod attached to the primary lever, a manipulative trip lever mounted intermediate its ends upon the transverse pivot, one trip lever end being shaped into a manipulative thumb piece that extends exteriorly alongside said handle and the other trip lever end terminating in a bifurcated toe, a longitudinally retained arcuate sector bar whose center of curvature substantially coincides with the axis of the main fulcrum, an elongated relatively flat clutch block mounted lengthwise upon the primary lever to rockingly tilt about a fulcrum agency integral with the last named lever and located intermediate the lever handle and the sector bar, said block being apertured at one end region to receive the sector bar therethrough and the other block end having complementary jaws with a gap therebetween, the bifurcated toe end of the clutch block extending overlappingly into and rockingly meshing with the block gap to constitute a shrouded block actuating joint.

6. In a vehicle brake actuating assembly adapted to be hand operated, a stationary bracket plate having a main fulcrum mounted therethrough, a sheet metal primary lever provided with a transverse pivot located between the ends thereof and which lever has a channeled cross-sectional profile including web interconnected side flanges that terminate in a handle and the opposite end portion of which lever is bifurcated into complementary forks that are pivotally mounted on the main fulcrum, each such forked flange being provided with a slot having registering perimeters that respectively comprise a pair of opposed reentrant fulcrum points and of which one such perimeter includes a stop edge portion directed radially toward the main fulcrum, a brake rod attached to the primary lever, a manipulative trip lever mounted intermediate its ends upon the transverse pivot, one trip lever end being shaped into a manipulative thumb piece, a sector bar carried by the bracket plate, an elongated clutch block floatingly mounted to move lengthwise in said registering slots and rockingly tilt about certain of the aforesaid fulcrum points toward and away from the stop edges, said block being apertured at one end region to freely pass the sector bar therethrough and which aperture comprises a pair of opposed pinch edges that when tilted away from said stop edge serve to firmly grip the bar therebetween, means operatively interconnecting the other end region of the clutch block with a contiguous end portion of the trip lever, and resilient means normally thrusting said clutch block away from the aforesaid stop edge.

7. In a vehicle brake actuating assembly adapted to be hand operated by a driver, a sheet metal primary lever provided with a transverse pivot located between the ends thereof and of which lever one end portion has a channeled cross-sectional profile including web interconnected side flanges that terminate in a handle and the opposite lever end portion is bifurcated into complementary forks, each such fork being provided with a flange slot whose perimeters respectively lie in substantial registration in a direction lengthwise of said lever, a stationary bracket plate interposed between the lever forks, a main fulcrum pivotally interconnecting said forks to the bracket plate, a brake rod attached to the primary lever, a manipulative sheet metal trip lever mounted intermediate its ends upon the transverse pivot and also having a channeled cross-sectional profile including mated web interconnected side flanges that telescopically mount therebetween corresponding flanges of the primary lever to constitute a boxlike inclosure extending from said handle to the forks of the primary lever, one end of such exteriorly disposed trip lever being shaped into a manipulative thumb piece that cooperatively extends alongside of said handle and lies toward the driver, an arcuate sector bar carried by said bracket plate, an elongated clutch block mounted in said registering slots to rockingly tilt about a fulcrum located intermediate the sector rod and said lever handle, said block being apertured at one end region thereof to freely pass the sector bar therethrough and which aperture comprises a pair of opposed pinch edges that when tilted with respect to the bar axis firmly grip the bar therebetween, means operatively interconnecting the other end region of the clutch block with a contiguous end portion of the trip lever, retained pin means entered through the primary and the trip lever webs, and spring means coiled about said pin means to thrust the thumb piece outwardly away from said handle.

FLOYD D. WENN.